US008540860B2

(12) United States Patent
Cho (10) Patent No.: US 8,540,860 B2
(45) Date of Patent: Sep. 24, 2013

(54) UNIT FOR PRODUCING STERILIZED WATER, CARTRIDGE COMPRISING THE UNIT AND WASHING MACHINE COMPRISING THE CARTRIDGE

(75) Inventor: Keum-il Cho, Gyeonggi-do (KR)

(73) Assignee: Greentech Co., Ltd., Incheon (KR)

( * ) Notice: Subject to any disclaimer, the term of this patent is extended or adjusted under 35 U.S.C. 154(b) by 584 days.

(21) Appl. No.: 12/714,934

(22) Filed: Mar. 1, 2010

(65) Prior Publication Data

US 2010/0224483 A1 Sep. 9, 2010

(30) Foreign Application Priority Data

Mar. 4, 2009 (KR) ........................ 10-2009-0018365

(51) Int. Cl.
*C02F 1/467* (2006.01)
*C02F 1/46* (2006.01)
(52) U.S. Cl.
USPC ........... 204/674; 204/242; 204/267; 204/672; 205/742; 205/758
(58) Field of Classification Search
USPC .................................................. 204/232, 674
See application file for complete search history.

(56) References Cited

U.S. PATENT DOCUMENTS 5,681,457 A * 10/1997 Mahoney .................... 210/198.1
6,663,766 B1 * 12/2003 Adin et al. ..................... 205/742
2007/0272550 A1 * 11/2007 Shiue et al. ................... 204/267
2009/0008268 A1 * 1/2009 Salathe et al. ................ 205/746
2009/0317491 A1 * 12/2009 Kim ............................. 424/661
2010/0126943 A1 * 5/2010 Lee .......................... 210/748.11
2010/0326466 A1 * 12/2010 Kawakami et al. ............... 134/3

FOREIGN PATENT DOCUMENTS

JP 2008307524 * 12/2008

* cited by examiner

*Primary Examiner* — Luan Van
*Assistant Examiner* — Bryan D. Ripa
(74) *Attorney, Agent, or Firm* — Alston & Bird LLP (57) ABSTRACT

Disclosed is a unit for producing sterilized water. The unit comprises an electrode module, a pair of electrode rods and a frame. The electrode module includes a pair of electrode plates and a hollow electrode separator positioned between the electrode plates to separate the electrode plates from each other. Each of the electrode plates has a plurality of elongated slots formed therein. The electrode rods apply different voltages to the respective electrode plates. The frame is positioned at one side of the electrode module and has portions for receiving the respective electrode rods. Each of the electrode plates has a pair of holes formed at the circumference thereof. The electrode rods penetrate through the respective holes. The holes have different sizes. The electrode plates are stacked in such a manner that the holes having different sizes overlap each other. This stack enables the application of different voltages to the electrode plates through the respective electrode rods. The unit is easy to manufacture due to its simple structure and can produce sterilized water in high efficiency.

13 Claims, 7 Drawing Sheets

UNIT FOR PRODUCING STERILIZED WATER, CARTRIDGE COMPRISING THE UNIT AND WASHING MACHINE COMPRISING THE CARTRIDGE

CROSS REFERENCE TO RELATED APPLICATIONS

This application claims priority from Korean Application No. 10-2009-0018365, filed Mar. 4, 2009, which is hereby incorporated herein in its entirety by reference.

BACKGROUND OF THE INVENTION

1. Field of the Invention

The present invention relates to a unit for producing sterilized water. More specifically, the present invention relates to a unit for producing sterilized water that makes water into plasma ions by underwater discharge to generate anions capable of killing germs, viruses, bacteria, etc. living in the water and removing detergent remnants and pollutants, etc. present in the water. The present invention also relates to a cartridge comprising the unit, and a washing machine comprising the cartridge.

2. Description of the Related Art

In recent years, air and soil pollution has become more serious. Under such circumstances, environmental diseases, such as allergic and atopic diseases, are highly prevalent. With the recent increasing interest in well-being, attention toward better health has been increasing gradually.

Tap water is mainly used as supply water for sanitary appliances, such as washing machines, bidets, dish washers and water purifiers. However, germs, viruses and bacteria living in tap water may have a bad influence on clothes, dishes or the human skin in contact with the tap water and may cause problems in terms of cleanliness and hygiene.

In attempts to solve such problems, there have been developed devices for sterilizing tap water and supplying the sterilized water. A known sterilized water producing apparatus comprises a positive electrode, a negative electrode and a diaphragm interposed between the two electrodes in which a mixture of water and brine as dilute physiological saline is electrolyzed into acidic sterilized water.

However, this apparatus is structurally complicated and incurs considerable costs in producing a sufficient amount of sterilized water per unit time, which hinder the widespread use of the apparatus.

Thus, there is a continuously increasing need for an apparatus that can produce sterilized water in a simple manner to ensure hygiene and safety of users and is easy to manufacture due to its simple structure.

SUMMARY OF THE INVENTION

It is a first object of the present invention to provide a unit that can produce sterilized water in high efficiency as well as is easy to manufacture due to its simple structure.

It is a second object of the present invention to provide a sterilized water producing cartridge that comprises a case in the form of a cartridge having a water inlet and a water outlet to accommodate the sterilized water producing unit and that can be easily attached to an apparatus using water.

It is a third object of the present invention to provide a washing machine comprising the sterilized water producing cartridge.

In order to accomplish the first object of the present invention, there is provided a unit for producing sterilized water, comprising: an electrode module including a pair of electrode plates, each of which has a plurality of elongated slots formed therein, and a hollow electrode separator positioned between the electrode plates to separate the electrode plates from each other; a pair of electrode rods for applying different voltages to the respective electrode plates; and a frame positioned at one side of the electrode module and having portions for receiving the respective electrode rods, wherein each of the electrode plates has a pair of holes, through which the respective electrode rods penetrate, having different sizes formed at the circumference thereof and the electrode plates are stacked in such a manner that the holes having different sizes overlap each other so that different voltages are applied to the electrode plates through the respective electrode rods.

In an embodiment, each of the electrode rods is a screw having an externally threaded portion and each of the electrode plates is fastened to the externally threaded portion of the electrode rod so that the electrode plate is in contact with the electrode rod along the circumferential surface of the hole through which the electrode rod penetrates.

In a preferred embodiment, the electrode separator has a pair of recessed portions in communication with the holes through which the respective electrode rods penetrate and a connection portion for connecting the recessed portions to each other.

In a preferred embodiment, the electrode plates are arranged in such a manner that the slots cross each other.

In an embodiment, the unit may further comprise an electrode plate provided at the other side of the electrode module and an electrode separator provided between the additional electrode plate and the electrode module.

In an embodiment, the electrode module may be provided in plurality and the electrode modules may be stacked on each other; an electrode separator may be further provided between the adjacent electrode modules; and different voltages may be applied to the electrode plates of the respective electrode modules through the electrode rods.

In order to accomplish the second object of the present invention, there is provided a cartridge for producing sterilized water by sterilizing water supplied through a water inlet by underwater discharge and discharging the sterilized water to the outside through a water outlet, the cartridge comprising the sterilized water producing unit and a case accommodating the unit wherein the case consists of a bottom case provided with the water inlet and a top case provided with the water outlet.

In a preferred embodiment, the water inlet is formed on the lower surface of the bottom case and the water outlet is formed on the upper or side surface of the top case.

In a preferred embodiment, the cartridge further comprises a flow guiding member having a plurality of guide holes installed between the unit and the water inlet of the bottom case.

In an embodiment, the cartridge may further comprises a UV light-emitting diode (UV LED) having sterilization performance installed within the case.

In an embodiment, the water inlet may be positioned eccentrically on the lower surface of the bottom case and the bottom case may have flow guiding grooves formed on the bottom surface thereof to guide the flow of water supplied through the water inlet.

In an embodiment, the cartridge may further comprise an ultrasonic oscillator fixedly installed in the frame to prevent the formation of scale on the electrode plates.

In order to accomplish the third object of the present invention, there is provided a washing machine comprising the cartridge, a water supply part and a washing tub wherein the water inlet of the cartridge is connected to the water supply part, the water outlet of the cartridge is connected to the washing tub, and sterilized water produced in the cartridge is supplied to the washing tub.

In a preferred embodiment, the washing machine may further comprise a 3-way valve as a solenoid valve provided between the water supply part of the washing machine and the water inlet of the cartridge to control the supply of water to the cartridge and the drainage of water.

In a preferred embodiment, the washing machine may further comprise a feed unit connected to the cartridge to feed a cleaning solution capable of removing scale formed on the electrode plates into the cartridge.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention provides a unit for producing sterilized water that makes water into plasma ions by underwater discharge to generate anions ($O^{31}$, $O_3^-$, $OH^-$), hypochlorite acid (HOCl) and hydrogen peroxide ($H_2O_2$) capable of killing germs, viruses, bacteria, etc. living in the water.

Even when a low voltage is applied to the unit of the present invention, the underwater plasma discharge can be induced to generate a large number of anions. That is, the mechanism of the unit according to the present invention is to decompose water molecules based on the principle of underwater discharge in order to make sterilized water.

In the course of this procedure, the water molecules are decomposed into hydrogen ions ($H^+$) and oxygen ions ($O^-$), the oxygen ions continuously react with the adjacent water molecules to form hydroxyl groups ($OH^-$), the hydroxyl groups have strong sterilization power and oxidizing power to kill germs and remove impurities and detergent remnants in the water. The oxygen-based ions $O^-$ and $O_3^-$, HOCl and $H_2O_2$, which are formed simultaneously with the hydroxyl groups, also perform the same functions as the hydroxyl groups. The anions are reduced to water. Therefore, sterilized water can be continuously produced without causing contamination, unlike other chemical additives.

Preferred embodiments of the present invention will now be described in more detail with reference to the accompanying drawings. However, these embodiments are not intended to limit the invention. It should be pointed out that the terminologies and words used in this specification and claims should be interpreted as meanings and concepts corresponding to the technical ideas of the present invention based on the principle that the inventor can properly define the concepts of the terminologies to best describe his own invention.

Figure 1:
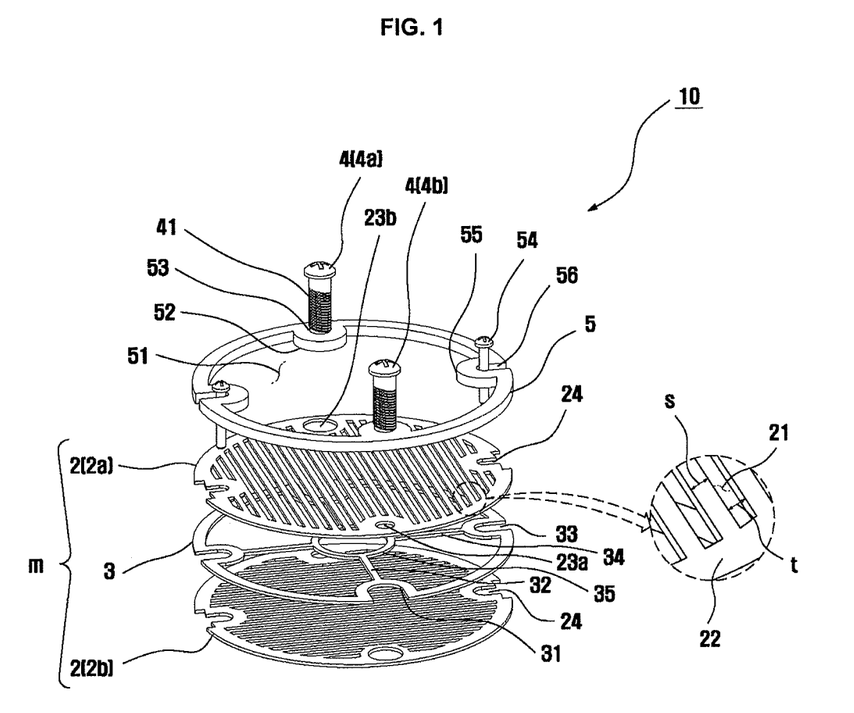
FIG. 1 is an exploded perspective view illustrating a sterilized water producing unit according to an embodiment of the present invention.

FIG. 1 is a view illustrating the construction of a sterilized water producing unit 10 according to an embodiment of the present invention. The unit 10 sterilizes running water by underwater discharge.

As illustrated in FIG. 1, the unit 10 comprises an electrode module m including a pair of electrode plates 2a and 2b and an electrode separator 3 positioned between the electrode plates, a pair of electrode rods 4a and 4b for applying different voltages to the respective electrode plates to cause underwater discharge of water between both the electrode plates, and a ring-like frame 5 for receiving the electrode rods 4a and 4b and fixing the electrode module m.

Each of the electrode plates 2a and 2b has a plurality of elongated slots 21 formed therein. Water is sterilized by underwater discharge while flowing through the slots 21. No particular limitation is imposed on the width t of the slots, but the width t is preferably the same as the spacing s between the adjacent slots taking into consideration the stiffness of the electrode plates and the amount of water flowing through the slots.

Each of the electrode plates 2a and 2b has a circumferential portion 22 in which no slot is formed. Each of the circumferential portions 22 has a pair of holes 23a and 23b through which the electrode rods 4b and 4a for applying voltages to the electrode plates penetrate, respectively, and recessed portions 24 for fixing the electrode module m.

The holes 23a and 23b have different sizes in order to facilitate the application of different voltages to the electrode plates 2a and 2b. For example, the size of the hole 23a is substantially the same as the outer diameter of the electrode rod 4b so that a voltage is applied to the electrode plate 2a through the electrode rod 4b penetrating and in contact with the hole 23a.

It is particularly preferred that each of the electrode rods 23a and 23b is a screw having an externally threaded portion 41. That is, each of the electrode rods 4a and 4b is threaded. For example, this threading allows the electrode plates to be positioned in the threaded groove of the electrode rod 4b and to be engaged with the electrode rod 4b so that the electrode rod 4b can be brought into contact with the electrode plates 2a and 2b along the outer circumference of the hole 23a. Due to this construction, the contact areas between the electrode rods and the electrode plates can be maximized to increase the efficiency of underwater discharge.

The hole 23b has a size sufficiently larger than the outer diameter of the electrode rod 4a. These dimensions prevent the deliver of a voltage applied to the electrode rod 4a to the electrode plate 2a through the hole 23b. The electrode plates 2a and 2b are stacked such that the holes 23a and 23b having different sizes are arranged alternately in communication with each other. This stack enables the application of different voltages to the respective electrode plates.

The holes having different sizes facilitate the application of different voltages to the electrode plates therethrough.

The electrode plates are made by coating or depositing at least one platinum group element, such as platinum, iridium, palladium, osmium or ruthenium, on titanium as a base material. Titanium is harmless to humans and has excellent characteristics in terms of corrosion resistance, acid resistance, heat resistance and mechanical tensile strength. Alternatively, the electrode plates may be made by depositing titanium on a general iron plate and coating or depositing a platinum group element thereon. The use of the iron plate is advantageous in terms of cost efficiency.

The electrode separator 3 is positioned between the electrode plates 2a and 2b. The electrode separator 3 serves to electrically separate the electrode plates 2a and 2b from each other. The electrode separator 3 preferably has a structure in which the electrode plates are electrically insulated from each other without obstructing the flow of water passing through the electrode plates. For this purpose, the electrode separator 3 has a hollow structure and has a pair of recessed portions 31 through which the respective electrode rods penetrate and a pair of fixing recessed portions 33 formed at the circumference thereof. The recessed portions 31 have a size sufficiently larger than the outer diameter of the electrode rods such that the electrode rods are not brought into contact with the electrode separator.

The electrode separator should have a large contact area with the electrode plates to ensure good insulation performance without disturbing a smooth flow of water because the electrode plates may be brought into contact with each other by the pressure of water flowing through the electrode module to impede the underwater discharge. To meet the conflicting requirements, the electrode separator has an elongated band-like portion 32 for connecting the recessed portions 31 to each other. Preferably, the width of the connection portion 32 is substantially the same or smaller than the width t of the slots or the spacing s between the adjacent slots to ensure a smooth flow of water. The electrode separator may have an elongated band-like portion 34 for connecting the fixing recessed portions 33 to each other. A circular central connection portion 35 may be formed in an area where the connection portions 34 and 32 cross each other.

As described above, the electrode module m is constructed in such a manner that the electrode plates 2a and 2b are separated by the electrode separator. As illustrated in FIG. 1, the electrode plates are arranged such that the slots cross each other. It is particularly preferred that flow passages defined by the electrode plates are in the shape of squares. This arrangement greatly increases the water electrolysis performance, leading to high production efficiency of sterilized water.

The frame 5 serves to fix the electrode module m and receives and supports the electrode rods 4a and 4b. The frame 5 has a ring shape in which a hollow 51 is formed. The frame 5 has portions 52 for receiving the respective electrode rods and fixing portions 55 formed at the circumference thereof. Each of the receiving portions 52 has an insertion hole 53 into which the corresponding electrode rod is inserted. Each of the fixing portions 55 has a recessed portion 56 into which a fixing member 54 is inserted to fix the electrode module m to the frame 5. No particular limitation on the shape of the electrode rods 4a and 4b. It is preferred to form the electrode rods 4a and 4b in the shape of screws in terms of ease of insertion, coupling and disassembly.

Figure 2:
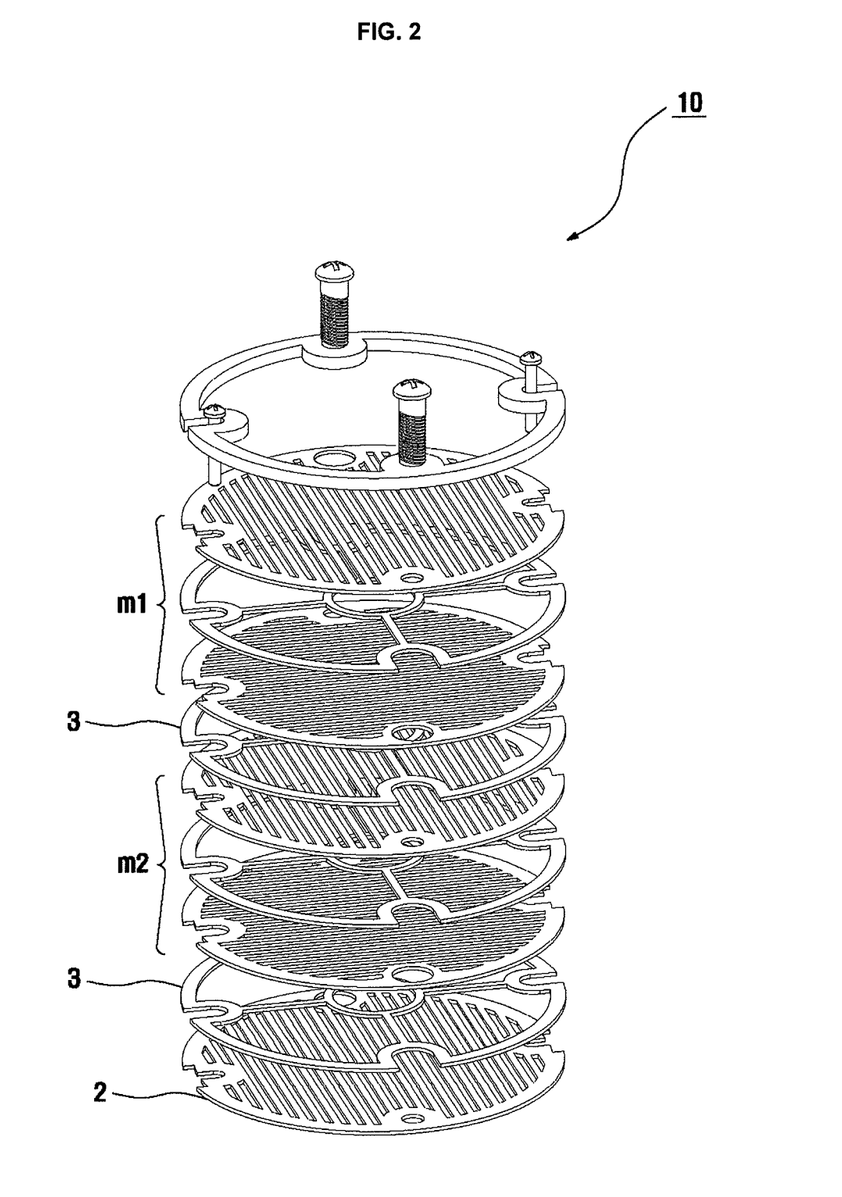
FIG. 2 is an exploded perspective view illustrating a sterilized water producing unit according to another embodiment of the present invention.

FIG. 2 illustrates a sterilized water producing unit 10 according to another preferred embodiment of the present invention. As illustrated in FIG. 2, the unit 10 may be constructed in such a manner that a plurality of electrode modules m1, m2, . . . , are stacked. An electrode separator 3 is further provided between the adjacent electrode modules. This construction enables the alternate application of different voltages to respective electrode plates of the stack of the electrode modules through a pair of electrode rods, thereby further improving the production efficiency of sterilized water.

Instead of stacking the electrode modules, an electrode plate 2 may be further positioned below the electrode module m1 and an electrode separator 3 may be provided between the additional electrode plate 2 and the electrode module m1. In this case, the unit 10 comprises three electrode plates and two electrode separators.

Figure 3:
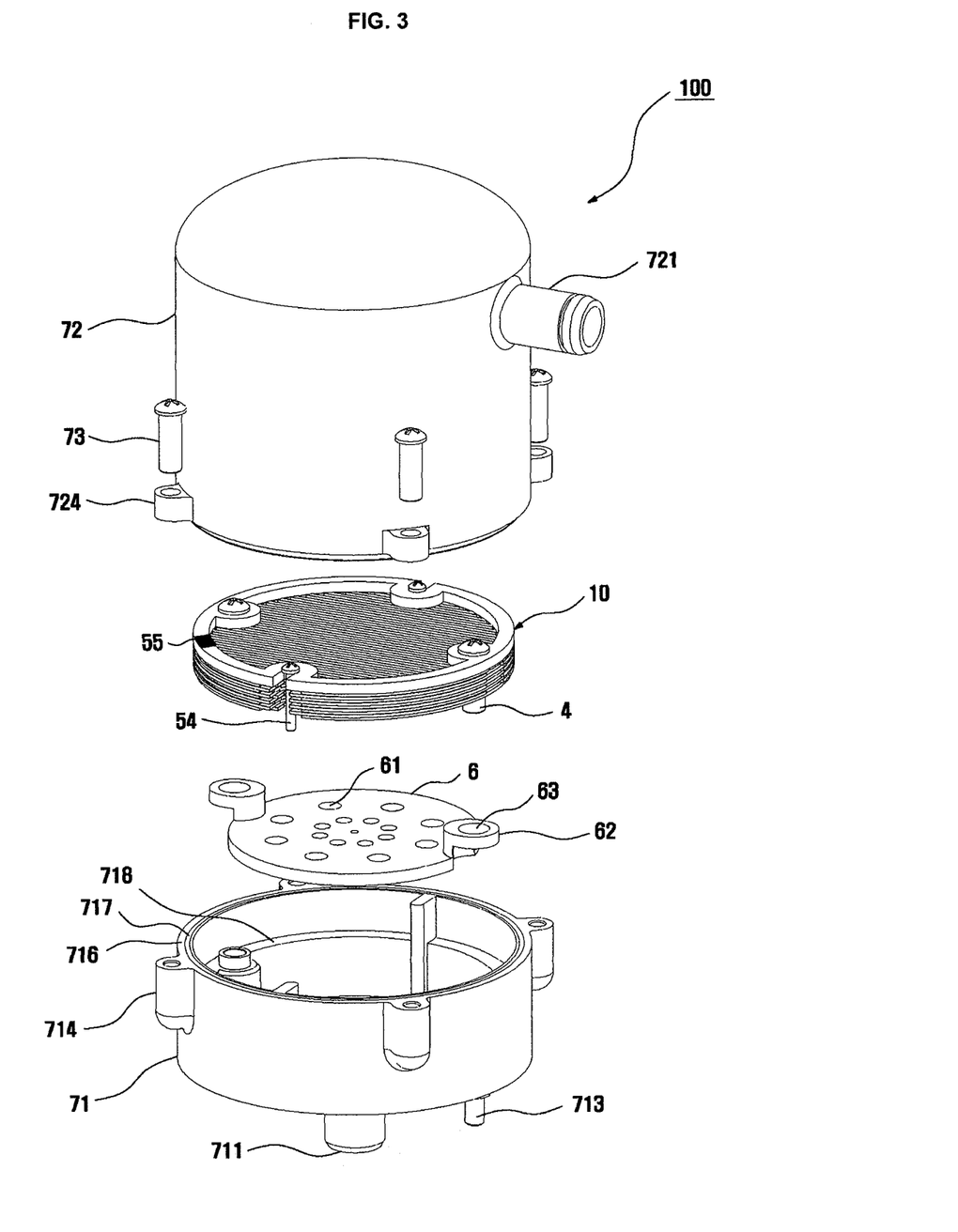
FIG. 3 is an exploded perspective view illustrating a sterilized water producing cartridge according to an embodiment of the present invention.
Figure 4:
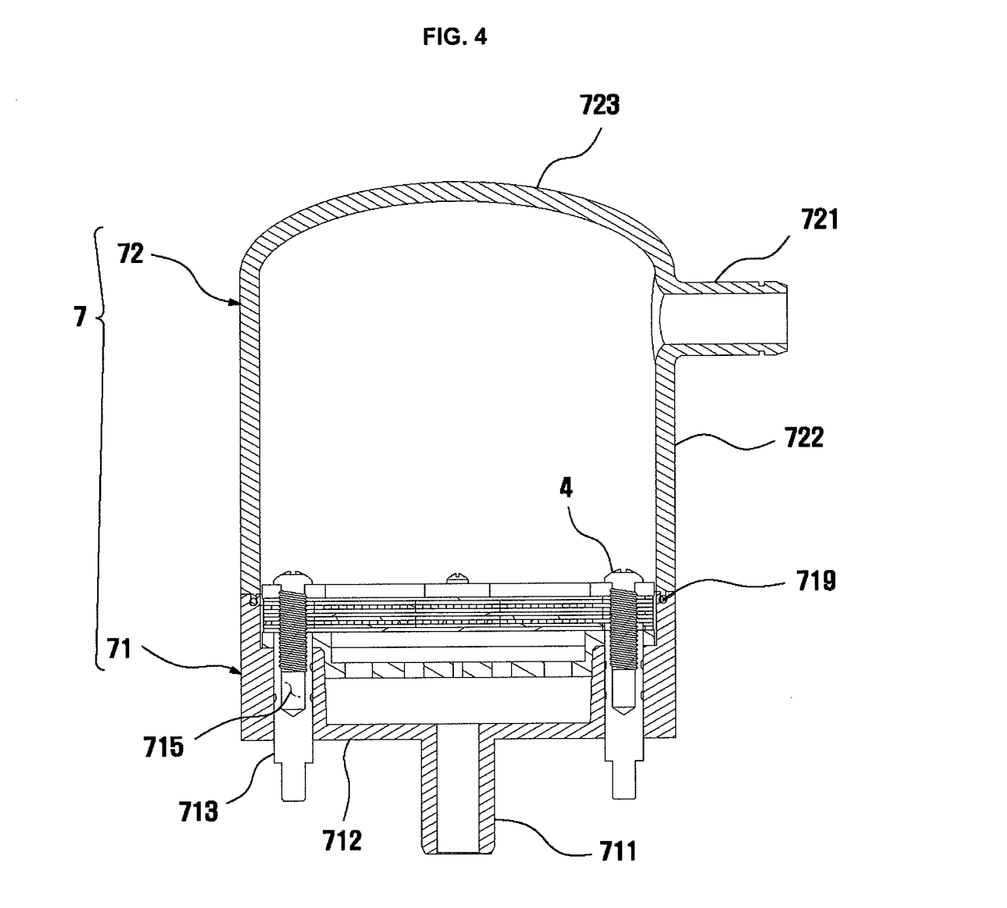
FIG. 4 is an assembled cross-sectional view illustrating the sterilized water producing cartridge of FIG. 3.

Now, an explanation will be given of a sterilized water producing cartridge comprising the unit 10. FIGS. 3 and 4 illustrate a sterilized water producing cartridge 100 according to an embodiment of the present invention.

The cartridge 100 is a device for converting water supplied through a water inlet 711 into sterilized water and discharging the sterilized water to the outside through a water outlet 721. The cartridge 100 can be easily attached to a water supply pipe.

The cartridge 100 comprises a case 7 accommodating the unit 10 therein. The case 7 consists of a bottom case 71 and a top case 72. The two-piece case 7 is advantageous in terms of ease of assembly and disassembly.

The unit 10 is mounted on a seating portion 718 of the bottom case 71. Accordingly, water introduced into the cartridge 100 necessarily flows through the electrode plates 2a and 2b.

As illustrated in FIGS. 3 and 4, the water inlet 711 is formed on the lower surface 712 of the bottom case 71 and the water outlet 721 is formed on the side surface 722 of the top case 72. Alternatively, the water outlet may be formed on the upper surface 723 depending on the connection condition of an apparatus to which the cartridge is to be attached.

The reason for the positions of the water inlet and the water outlet is to further increase the water electrolysis efficiency. If the water inlet overlies the water outlet, water flows more rapidly through the unit 10 by gravity, and as a result, a smaller amount of the water is electrolyzed. In contrast, when the water inlet, through which water is supplied, is positioned below the water outlet, it takes a longer time for the water to pass through the unit 10, resulting in a further improvement in the production efficiency of sterilized water.

Fixing members 54 can be fixedly fitted into respective fixing holes (not shown) formed within the bottom case to fix the unit 10 to the bottom case 71.

The bottom case 71 has outwardly protruding connection terminals 713 capable of being electrically connected to the respective electrode rods 4a and 4b. Each of the connection terminals 713 has a connection hole 715 in which the corresponding electrode rod is accommodated. The electrode rods 4a and 4b are inserted into the respective connection holes 715. This insertion electrically connects the connection terminals 713 to the respective electrode rods. Accordingly, voltages from a power source connected to the connection terminals 713 can be applied to the electrode rods.

The bottom case 71 has a ring groove 717 formed at the upper end 716 thereof. A rubber ring 719 is installed within the ring groove 717 to prevent water from leaking out of the cartridge after the bottom case 71 is assembled with the top case 72.

The bottom case 71 has a plurality of lower coupling portions 714 formed along the outer circumference thereof. The bottom case 71 is coupled to the top case 72 by the coupling portions 714. The top case 72 has a plurality of upper coupling portions 724 formed at positions corresponding to the lower coupling portions 714 along the outer circumference thereof. The upper coupling portions can be easily coupled to the lower coupling portions by inserting coupling members 73 into the upper coupling portions and the lower coupling portions. The coupling members 73 may be screws or pins. The case 7 consisting of the top case and the bottom case separable from each other makes it easy to maintain and repair the unit accommodated therein.

A flow guiding member 6 may be provided between the unit 10 and the water inlet 711 of the bottom case to guide water supplied through the water inlet 711 of the bottom case 71 so as to flow over the entire surfaces of the electrode plates 2a and 2b of the unit 10. The flow guiding member 6 is in the shape of a disk and has a plurality of guide holes 61 through which water flows. The flow guiding member 6 has portions 62 formed at both sides thereof through which the electrode rods 4a and 4b passes. The portions 62 are not in contact with the electrode rods 4a and 4b. The portions 62 extend upward from the flow guiding member 6 to create a space in which water flows when the unit 10 is assembled with the flow guiding member 6.

Each of the electrode rods 4a and 4b passes through a guide hole 63 of the portion 62 and is electrically connected to the connection terminal 713 of the bottom case 71. Each of the electrode rods is not in contact with the flow guiding member 6 because the guide hole 63 has a size sufficiently larger than the outer diameter of the electrode rod.

It is preferred that the guide holes 61 of the flow guiding member 6 are larger in size with increasing distance from the center of the flow guiding member 6. If the water inlet 711 is formed at a substantially central position of the bottom case 71, a larger amount of water tends to flow through the center of the electrode plates of the electrode module m. In view of this phenomenon, the size of the guide holes 61 is determined. That is, the guide holes 61 positioned at the center of the flow guiding member 6 are smaller in size than the guide holes 61 positioned near the circumference of the flow guiding member 6. This arrangement allows water introduced into the cartridge through the flow guiding member 6 to pass over the entire surface of the electrode module m.

An ultrasonic oscillator 55 may be fixedly installed in the frame 5 of the unit 10. The ultrasonic oscillator 55 is operated to prevent the formation of scale or physically remove scale formed during electrolysis of water. The position of the ultrasonic oscillator 55 is not necessarily limited to the frame 5. The ultrasonic oscillator 55 may be installed anywhere in the cartridge so long as physical oscillation of the ultrasonic oscillator 55 can be delivered to the electrode plates.

Figure 7:
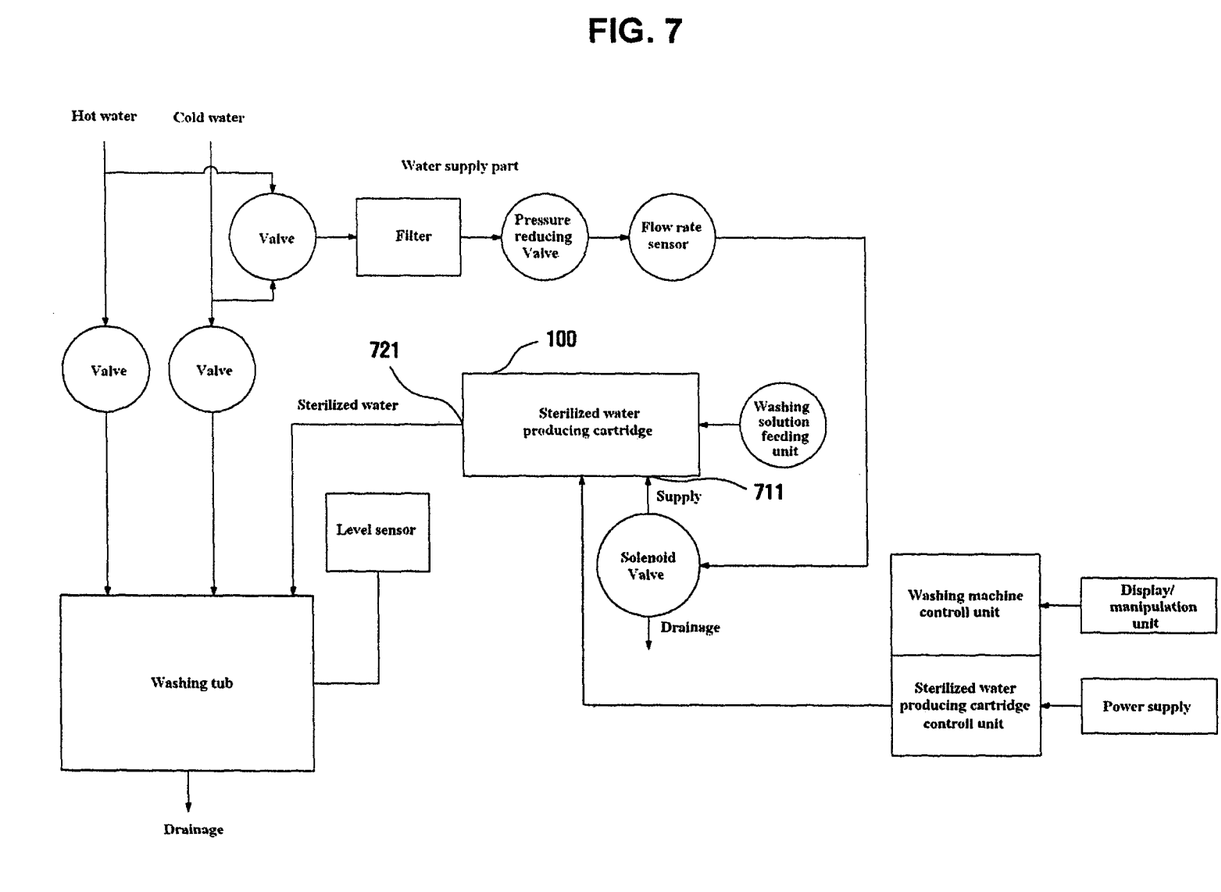
FIG. 7 is a flow diagram illustrating the operation of a washing machine to which the cartridge of FIG. 3 or 5 is attached.

A feeding unit may be attached to the cartridge (see FIG. 7). A chemical cleaning solution can be fed into the sterilized water producing cartridge by the feeding unit to chemically remove scale deposited on the electrode plates.

Figure 5:
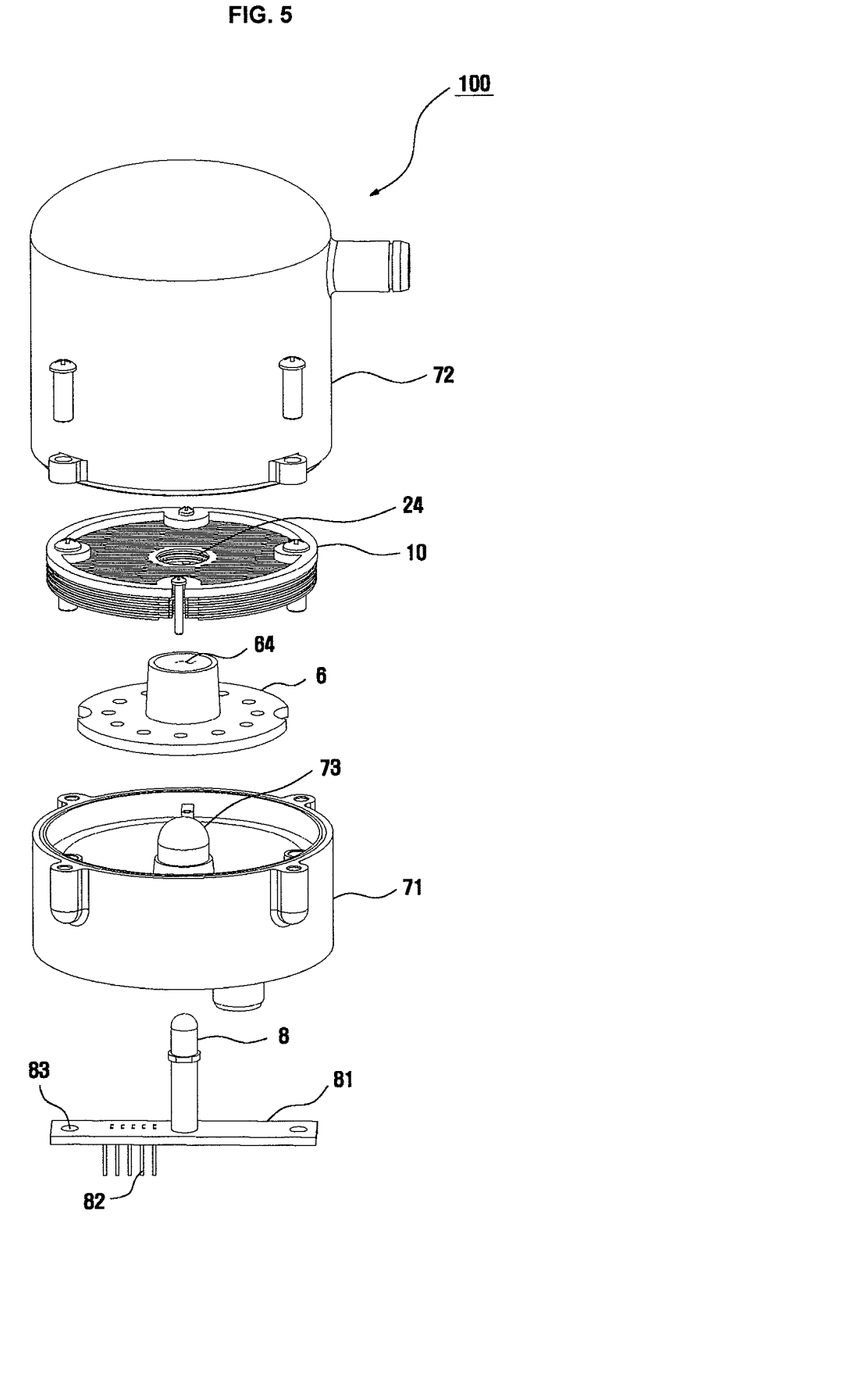
FIG. 5 is an exploded perspective view illustrating a sterilized water producing cartridge according to another embodiment of the present invention.
Figure 6:
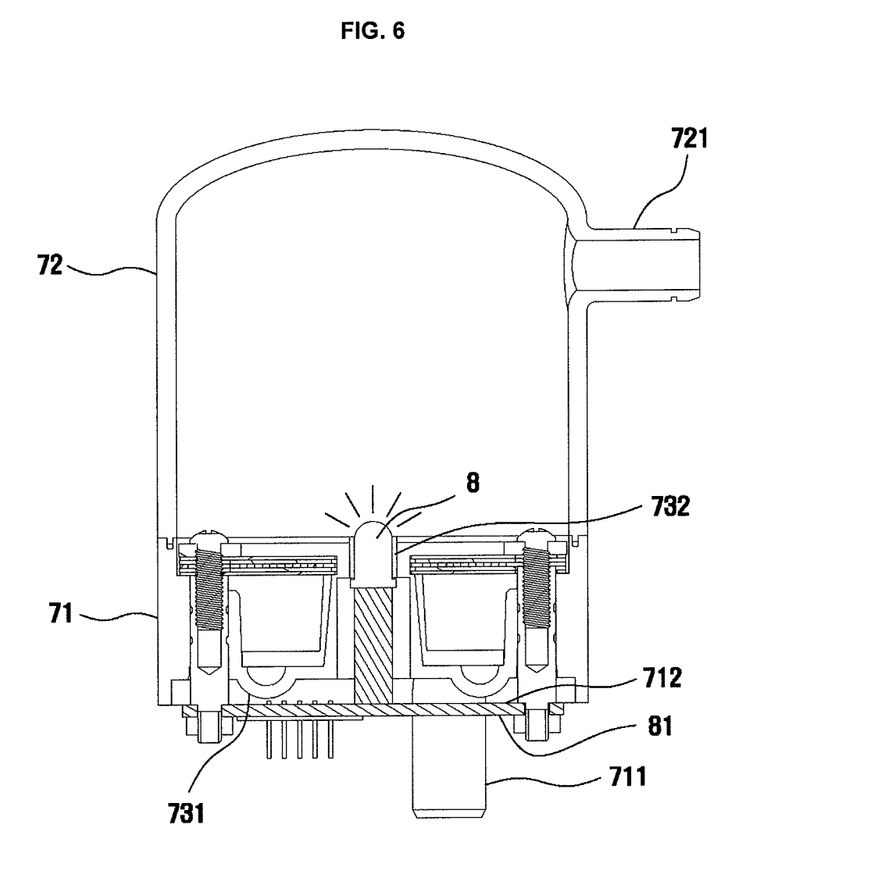
FIG. 6 is an assembled cross-sectional view illustrating the sterilized water producing cartridge of FIG. 5.

FIGS. 5 and 6 illustrate a sterilized water producing cartridge 100 according to another preferred embodiment of the present invention. The cartridge 100 comprises a UV LED 8 having sterilization performance to further improve the sterilization performance of sterilized water. The UV LED 8 can be attached anywhere in the case 7. The UV LED 8 can be installed without the need to disassemble the case 7 when it is intended to irradiate UV light into the case 7.

For example, the UV LED 8 can be installed on a substrate 81. The substrate 81 can be detachably attached to the lower surface 712 of the bottom case 71 without the need to disassemble the case 7. An LED housing 73 is formed in the bottom case 71 to accommodate the UV LED 8. When the substrate 81 is attached to the lower surface 712 of the bottom case 71, the UV LED 8 is accommodated in the LED housing 73.

The electrode module m and the flow guiding member 6 have central holes 24 and 64, respectively, through which the LED housing 73 penetrates. When the unit 10 and the flow guiding member 6 are mounted in the bottom case, the distal end of the LED housing 73 protrudes upward from the electrode module m. The UV LED 8 irradiates UV light onto sterilized water produced by underwater discharge to further enhance the sterilization performance of the sterilized water.

Alternatively, the UV LED 8 may be directly installed within the case instead of being accommodated in the LED housing 73. For example, the UV LED 8 is installed by directly inserting into the central hole 24 of the electrode module m, as illustrated in FIG. 6. A sealing member 732 can be interposed between the central hole 24 and the UV LED 8 to seal the outer circumference of the UV LED 8.

The substrate 81 has connection pins 82 for power supply and connection holes 83 through which the connection terminals 713 of the bottom case 71 penetrate. When a power source is connected to the connection pins 82, power can be easily supplied to the electrode rods 4a and 4b and the UV LED 8.

Power levels supplied to the electrode plates 2a and 2b, the UV LED 8 and the ultrasonic oscillator 55 can be controlled by a control unit (not shown) connected to the connection pins 82.

In the case where the UV LED 8 is installed in the cartridge, the water inlet 711 may be positioned eccentrically on the lower surface of the bottom case. In this case, the bottom case has flow guiding grooves 731 formed on the bottom thereof to guide a smooth flow of water into the electrode module m. Water introduced through the water inlet 711 flows along the flow guiding grooves 731. The flow guiding grooves 731 can solve the disadvantages arising from the eccentric position of the water inlet 711.

The production process of sterilized water in the cartridge of the present invention will be briefly explained below.

Water introduced into the case 7 through the water inlet 711 is subjected to underwater discharge in the electrode module m including the electrode plates 2a and 2b. The water ($H_2O$) is decomposed into ionic states of hydrogen (H) atoms and oxygen (O) atoms by the underwater discharge. The hydrogen and oxygen ions begin to diffuse in the water while evolving gas bubbles. Each oxygen atom has a tendency to bind to the surrounding oxygen atom to create an oxygen molecule ($O_2$). Each hydrogen atom loses one electron to form a hydrogen ion ($H^+$). The oxygen molecules absorb the surrounding electrons and are converted to oxygen anions ($O_2^-$). The hydrogen ions and the oxygen ions react with the surrounding water molecules to form hydroxyl groups ($OH^-$), hydrogen peroxide ($H_2O_2$) and ozone ($O_3$). The hydroxyl groups are very unstable owing to their ionic nature and tend to bind to $H^+$ present in the cell membranes of germs in the water. The cell membranes losing $H^+$ are destroyed, and as a result, the germs are killed. The hydroxyl ions gaining $H^+$ are reduced to water molecules. The $H_2O_2$ and $O_3$ evaporate immediately after their formation.

Very small amounts of chlorine components contained in the supply water react with the water molecules to form hypochlorite acid, which has the ability to kill germs.

Next, an explanation will be given of a washing machine comprising the sterilized water producing cartridge. FIG. 7 is a flow diagram illustrating the operation of a washing machine to which the sterilized water producing cartridge is attached.

Water is introduced into the cartridge 100 by the following procedure. Hot water and/or cold water supplied through respective pipes are selectively mixed by valves. The water is filtered through a filter to remove impurities present therein. The pressure of the filtered water is controlled by a pressure-reducing valve and the flow rate of the water supplied to the cartridge 100 is controlled using a flow rate sensor.

The water is fed into the cartridge 100 through a water supply part of the washing machine and the water inlet 711. The water is sterilized by underwater discharge in the cartridge 100. The sterilized water is supplied to a washing tub of the washing machine through the water outlet 721. The sterilized water can be used to rinse laundry.

Particularly, a solenoid valve may be provided between the water supply part of the washing machine and the water inlet of the cartridge. The solenoid valve is a 3-way valve for controlling the supply of the water to the cartridge and the drainage of water. When the cartridge is operated, the opening and closing of the solenoid valve is controlled such that the water is fed into the cartridge. When the operation of the cartridge is stopped, the opening and closing of the solenoid valve is controlled such that the water or the sterilized water present in the cartridge is drained.

The water drained out of the cartridge can protect the cartridge from freezing and bursting in the winter season. The sterilized water present in the cartridge is drained through a water drainage pipe (not shown). At this time, the sterilized water drained out of the cartridge removes germs, fungi, fur, etc. present in the water drainage pipe.

A feeding unit may be connected to the cartridge to feed a cleaning solution (e.g., acidic water, such as vinegar) into the cartridge. The cleaning solution chemically removes scale formed on the electrode plates during underwater discharge. The feeding unit is operated in such a manner that the cleaning solution is fed into the cartridge in a state in which the water supply is stopped by the solenoid valve. The scale removed from the electrode plates is drained, together with the water, out of the washing machine.

The cartridge and the washing machine can be controlled by respective control units illustrated in FIG. 7, and a detailed description thereof is omitted.

As is apparent from the above description, the sterilized water producing unit of the present invention can convert running water into water with strong sterilization power. In addition, the sterilized water producing unit is easy to manufacture due to its simple structure and can produce sterilized water with improved efficiency.

The sterilized water producing cartridge of the present invention can be easily attached to a water supply pipe of an apparatus using water. Therefore, the sterilized water producing cartridge can find application in various products. In addition, the sterilized water producing cartridge is simple to maintain and repair due to its ease of assembly and disassembly.

The washing machine of the present invention can use sterilized water during rinsing to kill germs living in laundry and can efficiently remove detergent remnants.

What is claimed is:

1. A unit for producing sterilized water by underwater discharge of supply water, comprising:
    an electrode module including a pair of electrode plates, each of which has a plurality of elongated slots formed therein, and a hollow electrode separator positioned between the electrode plates to separate the electrode plates from each other;
    a pair of electrode rods for applying different voltages to the respective electrode plates; and
    a frame positioned at one side of the electrode module and having portions for receiving the respective electrode rods,
    wherein each of the electrode plates has a pair of holes formed at a circumference thereof, through which the respective electrode rods penetrate, the pair of holes having different diameters, the diameter of one of the pair of holes being substantially the same as the outer diameter of the pair of electrode rods, the diameter of the other hole being larger than the outer diameter of the pair of electrode rods, and the electrode plates are stacked in such a manner that the each of the pair of holes of one of the electrode plates overlaps a respective one of the pair of holes of another electrode plate having a different diameter so that different voltages are applied to the electrode plates through the respective electrode rods, and
    wherein each of the electrode rods is a screw having an externally threaded portion and each of the electrode plates is fastened to the externally threaded portion of one of the pair of electrode rods so that each of the electrode plates is in contact with one of the pair of electrode rods along the circumferential surface of the hole through which the respective electrode rod penetrates,
    wherein the electrode separator has a pair of recessed portions in communication with the holes through which the respective electrode rods penetrate and a connection portion for connecting the recessed portions to each other.

2. The unit of claim 1, wherein the electrode plates are arranged in such a manner that the slots cross each other.

3. The unit of claim 1, further comprising an electrode plate provided at the other side of the electrode module and an electrode separator provided between the additional electrode plate and the electrode module.

4. The unit of claim 1, wherein the electrode module is provided in plurality and the electrode modules are stacked on each other; an electrode separator is further provided between the adjacent electrode modules; and different voltages are applied to the electrode plates of the respective electrode modules through the electrode rods.

5. A cartridge for producing sterilized water by sterilizing water supplied through a water inlet by underwater discharge and discharging the sterilized water to the outside through a water outlet, the cartridge comprising:
    the unit of claim 1; and
    a case accommodating the unit,
    wherein the case consists of a bottom case provided with the water inlet and a top case provided with the water outlet.

6. The cartridge of claim 5, wherein the water inlet is formed on the lower surface of the bottom case and the water outlet is formed on the upper or side surface of the top case.

7. The cartridge of claim 5, further comprising a flow guiding member having a plurality of guide holes installed between the unit and the water inlet of the bottom case.

8. The cartridge of claim 5, further comprising a UV light-emitting diode (UV LED) having sterilization performance installed within the case.

9. The cartridge of claim 8, wherein the water inlet is positioned eccentrically on the lower surface of the bottom case and the bottom case has flow guiding grooves formed on the bottom surface thereof to guide the flow of water supplied through the water inlet.

10. The cartridge of claim 5, further comprising an ultrasonic oscillator fixedly installed in the frame to prevent the formation of scale on the electrode plates.

11. A washing machine comprising the cartridge of claim 5, a water supply part and a washing tub wherein the water inlet of the cartridge is connected to the water supply part, the water outlet of the cartridge is connected to the washing tub, and sterilized water produced in the cartridge is supplied to the washing tub.

12. The washing machine of claim 11, further comprising a 3-way valve as a solenoid valve provided between the water supply part of the washing machine and the water inlet of the cartridge to control the supply of water to the cartridge and the drainage of water.

13. The washing machine of claim 11, further comprising a feed unit connected to the cartridge to feed a cleaning solution capable of removing scale formed on the electrode plates into the cartridge.

\* \* \* \* \*

UNITED STATES PATENT AND TRADEMARK OFFICE
CERTIFICATE OF CORRECTION

PATENT NO. : 8,540,860 B2  Page 1 of 1
APPLICATION NO. : 12/714934
DATED : September 24, 2013
INVENTOR(S) : Cho It is certified that error appears in the above-identified patent and that said Letters Patent is hereby corrected as shown below:

Title page:
Item (73) Assignee: "Greentech Co., Ltd." should read --Grentech Co., Ltd.--.

Signed and Sealed this
Sixth Day of May, 2014

Michelle K. Lee
*Deputy Director of the United States Patent and Trademark Office*